Oct. 18, 1949.  G. E. SHELDRICK  2,485,324
CUTTING TOOL
Filed Oct. 9, 1944
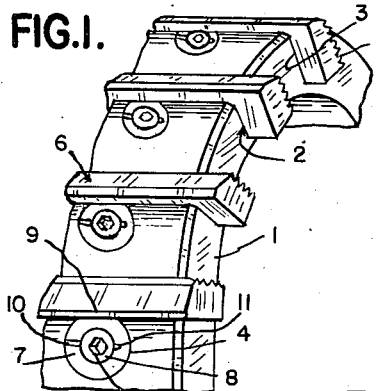
FIG.1.
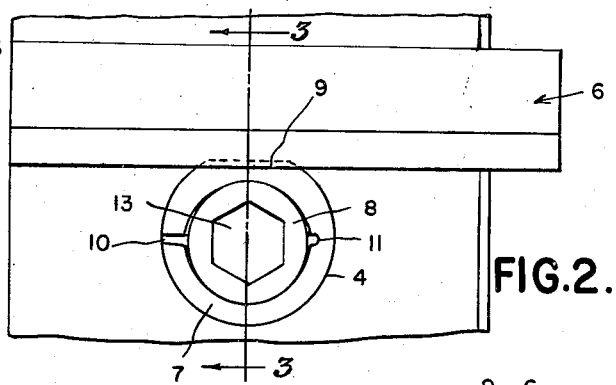
FIG.2. FIG.3.
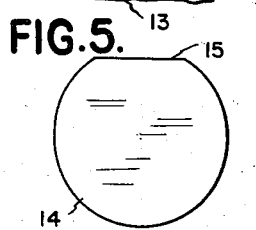
FIG.5.
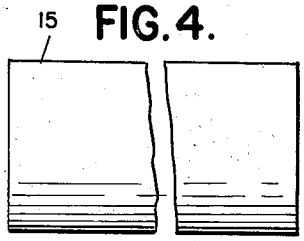
FIG.4.
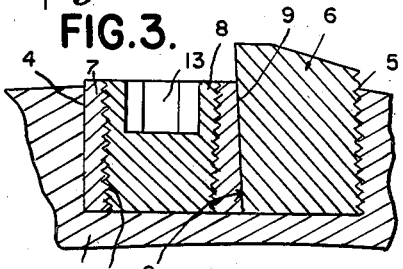
FIG.6. FIG.7. FIG.8.
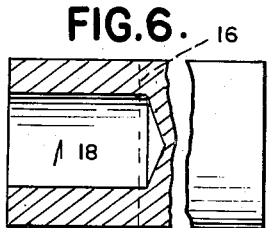
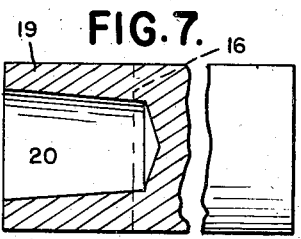
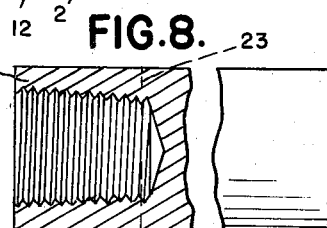
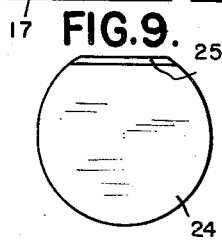
FIG.9.
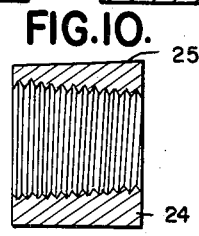
FIG.10.
FIG.13.
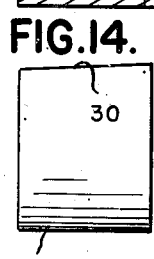
FIG.14.
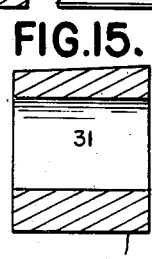
FIG.15.
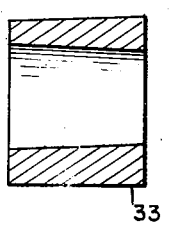
FIG.16.
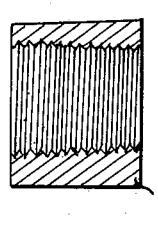
FIG.17.
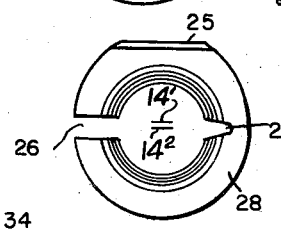
FIG.11. FIG.12.
INVENTOR.
GEORGE E. SHELDRICK
BY
ATTORNEYS Patented Oct. 18, 1949

2,485,324

UNITED STATES PATENT OFFICE 2,485,324

CUTTING TOOL

George E. Sheldrick, Grosse Pointe, Mich.

Application October 9, 1944, Serial No. 557,904

3 Claims. (Cl. 29—105)

1

The invention relates to cutting tools of the inserted blade type and refers more particularly to locks for securing the blades in place.

The invention has for one of its objects to provide an improved construction of cutting tool of the inserted blade type in which the blades are effectively secured to the body of the tool.

The invention has for another object to provide an improved lock having an expansible locking member which may be readily operated.

A further object of the invention resides in the method of forming the expansible locking member.

With these and other objects in view, the invention resides in the novel features as more fully hereinafter set forth.

In the drawings:

Figure 1 is a perspective view of the cutting tool embodying the invention;

Figure 2 is an enlarged edge elevation of a portion of the tool;

Figure 3 is a cross section on the line 3—3 of Figure 2;

Figure 4 is a side elevation of a bar used in the manufacture of an expansible locking member;

Figure 5 is an end elevation of the bar;

Figures 6, 7 and 8 are side elevations, partly in section, of blanks resulting from successive operations of one method of manufacture;

Figures 9 and 10 are, respectively, an end elevation and a longitudinal section of a blank resulting from the next successive operations;

Figures 11 and 12 are end elevations of blanks resulting from the next successive operations;

Figures 13 and 14 are, respectively, an end elevation and a side elevation of a blank resulting from the first operations upon the bar of Figures 4 and 5 according to another method of manufacture;

Figures 15, 16 and 17 are longitudinal sections of blanks resulting from successive operations.

As illustrated in the present instance, the cutting tool embodying the invention is a reamer in the nature of a shell tool having the annular body 1 adapted to be mounted upon a suitable arbor and provided with the series of angularly spaced recesses 2. Each recess has the generally rectangular opening 3 and the generally cylindrical opening 4 communicating with the generally rectangular opening at one side thereof intermediate the ends of the body. Both openings extend generally radially and open radially outwardly and the generally rectangular opening is also open at both ends. The side of each generally

2 rectangular opening opposite the generally cylindrical opening is preferably serrated with the serrations 5 extending axially of the tool. A cutting blade 6 extends within each generally rectangular opening 3 and preferably has a serrated side corresponding to the serrated side of the opening.

The lock for securing each blade to the body comprises the expansible locking member 7 and the expanding member 8. The locking member is a resilient sleeve within the generally cylindrical opening 4 and having the longitudinally extending flat face 9 inclined toward the axis of the sleeve from its radially inner end to its radially outer end and engaging and fitting the adjacent flat face of the blade. The sleeve is transversely split at one point only with the longitudinally extending split 10 extending substantially parallel to the flat face 9. The sleeve also has the longitudinal internal U-shaped groove 11 in substantial alignment with the split 10 and the internal threads 12 with the pitch of the threads tapering inwardly from the radially outer end of the sleeve. The sleeve is flattened transversely of the split so that the opening through the sleeve defined by the threads is generally elliptical with the minor axis transverse to the split and the groove. As a result, the tapered screw forming the expanding member 8 threaded in the sleeve bears upon the opposite portions of the sleeve transverse to the split and clears the opposite portions parallel to the split so that the screw may be readily screwed into or out of the sleeve without being appreciably affected by binding action, which is the case when the threads of the screw engage the threads of the sleeve throughout the whole circumferential extent, with the exception of the split. The radially outer end portion of the screw is preferably formed with the polygonal recess 13 for engagement by a suitable tool for threading the screw into and out of the sleeve.

In operation it will be noted that the screw bears upon the opposite flattened portions of the sleeve which extends transversely of the split and the groove and, as a result, the screw may be readily and easily screwed into the sleeve to expand the same and tightly clamp the blade to the body of the tool. Inasmuch as the opposite portions of the sleeve adjacent and parallel to the split and groove clear the screw, the screw is comparatively free of binding action. During the expansion by the screw most of the flexing occurs in the material radially outwardly of and adjacent to the groove. It is also apparent that the screw may be readily and easily turned in the opposite direction to allow the sleeve to retract and release the blade.

Figures 4 to 12, inclusive, illustrate a method of forming the expansible member 7 starting with the solid bar 14, as shown in Figures 4 and 5. The bar is mill stock formed of steel which is adapted upon heat treating to have spring properties. The bar is of a length to form several expansible members and is generally cylindrical, it having portions of the same radius with offset axes $14^1$ and $14^2$ with the longitudinally extending flat face 15 extending between the portions having the axis $14^1$.

The first operation upon the bar comprises longitudinally drilling it at one end to an extent slightly greater than the length of the expansible member 7, the dotted line 16 of the drilled blank 17 of Figure 6 representing the end of the expansible member 7 beyond which the bore 18 formed by the drilling slightly extends. The axis or center line of the bore 18 is offset from the axis or center line of the blank 17 away from the flat face 15 to approximately center the bore in the blank.

The next operation comprises taper-reaming the drilled portion of the blank 17 to form the blank 19 of Figure 7 having the taper-reamed recess 20.

After the taper-reaming operation, the blank is rough taper-tapped to produce the blank 21 having the rough taper-tapped recess, as shown in Figure 8.

The next operation comprises cutting the blank 21 on the line 23 which corresponds to the line 16 of Figure 6 to form a blank of predetermined length which is the same as that of the expansible member 7. This blank of predetermined length is then finish taper-tapped, after which the flat face 15 is machined so that the resulting blank 24, as shown in Figures 9 and 10, has the flat face 25 which is inclined toward the axis of the blank from one end to the other end. Furthermore, the blank is finish tapped.

The blank 24 is then machined as by being milled to form the longitudinally extending transverse split 26 substantially parallel to the flat face 25 and the longitudinally extending U-shaped groove 27 in substantial alignment with the split, the blank after these operations being the transversely split sleeve 28 shown in Figure 11.

After the burring or removal of the burrs formed by producing the split and groove the sleeve is flattened transversely of the split and groove so that the flat face 25 is part of one of the opposite flattened portions and the hole extending longitudinally through the sleeve is generally elliptical with the minor axis transverse to the split. The final operation in the forming of the expansible member comprises heat treating the flattened sleeve to give it the desired spring properties, the sleeve at this time being shown in Figure 12.

Figures 13 to 17, inclusive, illustrate other operations of another method of manufacture which may be used instead of the operations illustrated in Figures 6 to 10, inclusive. According to this other method of manufacture, the first operation upon the bar 14 of Figures 4 and 5 comprises cutting it to form several like blanks of predetermined length, after which the flat faced portion 15 of each blank is machined to form the blank 29 of predetermined length with the longitudinally extending flat face 30 inclined toward its axis from one end to the other end, as shown in Figures 13 and 14.

The next operation comprises longitudinally drilling the blank 29 with the axis or center line offset from the axis or center line of the blank away from the flat face 30 to approximately center the drilled hole 31 in the blank 32, as shown in Figure 15.

Then the drilled blank is taper-reamed to form the blank 33 of Figure 16, after which the blank 33 is taper-tapped to form the blank 34, as illustrated in Figure 17.

The operations of Figures 11 and 12 are then performed upon the blank 34 to produce the completed expansible member.

What I claim as my invention is:

1. In a cutting tool, the combination with a body having a recess and a cutting blade extending within the recess, of a lock for said blade comprising an expansible member extending within the recess and an expanding screw extending within said member, said member being transversely split at one point only and having a generally elliptical hole therethrough with the minor axis transverse to the split, said member having its minor axis defining portions internally threaded for engagement with said screw and also having one of said defining portions engaging said blade.

2. A lock for securing a cutting blade in a body of a cutting tool comprising a resilient expansible member having a tapered generally elliptical hole extending longitudinally therethrough, a transverse split extending transversely of the minor axis of the hole and an external flat face extending substantially parallel to the split, said member being internally threaded for engagement with a tapered screw.

3. In a cutting tool the combination with a body having a recess and a cutting blade extending within the recess, of a lock for said blade comprising an expansible sleeve extending within the recess and an expanding screw extending within said sleeve, said sleeve having a tapered generally elliptical hole extending longitudinally therethrough and being internally threaded for receiving said screw, said sleeve also having a longitudinally extending groove at one end of the major axis of the ellipse and an external flat face at one end of the minor axis of the ellipse for engagement with said blade.

GEORGE E. SHELDRICK.

REFERENCES CITED

The following references are of record in the file of this patent:

UNITED STATES PATENTS

| Number | Name | Date |
| --- | --- | --- |
| 1,328,509 | Ganster | Jan. 20, 1920 |
| 1,841,069 | Stenger | Jan. 12, 1932 |
| 1,971,230 | Nikoloff | Aug. 21, 1934 |
| 1,993,879 | Ellingham | Mar. 12, 1935 |
| 2,209,174 | Sheldrick | July 23, 1940 |
| 2,210,993 | Weatherhead | Aug. 13, 1940 |
| 2,331,555 | Jostich | Oct. 12, 1943 |